(12) United States Patent
Jung

(10) Patent No.: US 7,167,677 B2
(45) Date of Patent: Jan. 23, 2007

(54) CONTROL METHOD AND SYSTEM USING A BLUETOOTH FOR WIRELESS COMMUNICATION, AND A SERVER AND A TERMINAL USED FOR THE SAME

(75) Inventor: Soon-ho Jung, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 826 days.

(21) Appl. No.: 09/973,046

(22) Filed: Oct. 10, 2001

(65) Prior Publication Data

US 2002/0098804 A1    Jul. 25, 2002

(30) Foreign Application Priority Data

Jan. 19, 2001    (KR) ................... 2001-3253

(51) Int. Cl.
*H04B 5/00* (2006.01)

(52) U.S. Cl. .................. 455/41.2; 455/418; 455/556.1; 455/414.1

(58) Field of Classification Search ............... 455/3.01, 455/3.03, 3.06, 414.1, 414.3, 422.1, 41.2, 455/41.3, 418, 526, 507, 550.1, 556.1; 379/55.1
See application file for complete search history.

(56) References Cited

U.S. PATENT DOCUMENTS

| | | | | |
|---|---|---|---|---|
| 5,247,575 A * | 9/1993 | Sprague et al. ................ 705/53 |
| 5,694,549 A * | 12/1997 | Carlin et al. .................. 709/250 |
| 5,884,140 A * | 3/1999 | Ishizaki et al. ............. 455/2.01 |
| 5,978,775 A * | 11/1999 | Chen ............................ 705/26 |
| 6,349,409 B1 * | 2/2002 | Chan ........................... 725/105 |
| 6,381,513 B1 * | 4/2002 | Takase et al. ................ 700/231 |
| 6,587,835 B1 * | 7/2003 | Treyz et al. ................... 705/14 |
| 6,725,022 B1 * | 4/2004 | Clayton et al. ........... 455/154.1 |
| 6,760,595 B1 * | 7/2004 | Inselberg ..................... 455/517 |
| 6,763,247 B1 * | 7/2004 | Hollstrom et al. ........ 455/556.1 |
| 6,799,165 B1 * | 9/2004 | Boesjes ........................ 705/28 |
| 6,876,661 B1 * | 4/2005 | Asai ............................ 370/401 |
| 6,968,365 B1 * | 11/2005 | Hollstrom et al. ........... 709/217 |
| 2002/0082057 A1 * | 6/2002 | Kim ............................ 455/568 |
| 2002/0187749 A1 * | 12/2002 | Beasley et al. ............... 455/41 |
| 2003/0002504 A1 * | 1/2003 | Forstadius ................... 370/392 |

(Continued)

FOREIGN PATENT DOCUMENTS

JP    09-190374    7/1997

(Continued)

*Primary Examiner*—Binh K. Tieu
(74) *Attorney, Agent, or Firm*—Sughrue Mion, PLLC

(57) ABSTRACT

A control method and a system using a Bluetooth function for wireless data transmission and reception, and a server and a terminal used for the same. A database stores data to be transmitted from the server to the terminal. The data stored in the database are classified into many items. The server transmits an item selecting program to the terminal, allowing a user to select one or more items for data the user wishes to receive from the server. The terminal transmits to the server a data about an item selected and input by the user through the item selecting program. The server transmits to the terminal data corresponding to the user's selected item. Accordingly, the user can select an item, and thus obtain data corresponding to the selected item, i.e., the user can obtain the data that the user wants.

5 Claims, 4 Drawing Sheets

U.S. PATENT DOCUMENTS

2003/0050058 A1* 3/2003 Walsh et al. ................. 455/426
2003/0063043 A1* 4/2003 Girard ........................... 345/8
2004/0203382 A1* 10/2004 Park .......................... 455/41.2
2005/0037779 A1* 2/2005 Ma et al. ................. 455/456.6
2005/0094571 A1* 5/2005 Lempio et al. ............. 370/252
2005/0153729 A1* 7/2005 Logan et al. ............ 455/550.1

FOREIGN PATENT DOCUMENTS

WO    WO 01/41483 A1 *    7/2001

* cited by examiner

CONTROL METHOD AND SYSTEM USING A BLUETOOTH FOR WIRELESS COMMUNICATION, AND A SERVER AND A TERMINAL USED FOR THE SAME

BACKGROUND OF THE INVENTION

1. Field of the Invention

The present invention relates to a control method and a system using a Bluetooth for a wireless data transmission and reception, and more particularly to a control method and a system having a server and a terminal capable of mutual wireless data transmission and reception, and a server and a terminal used by the same. The present application is based on Korean Patent Application No. 2001-3253, which is incorporated herein by reference.

2. Description of the Related Art

Generally, for data transmission and reception through computers, or the like, a plurality of transmission lines are required. As the number of transmission lines increases, the environment becomes complex and inconvenience occurs in analyzing the connection status of the existing transmission lines when changing the connection status or adding a new transmission line. In order to solve such problems, a 'Bluetooth', which is a wireless data transceiver system enabling a wireless data transmission and reception within a limited distance approximately of 10 m, has been recently suggested.

FIG. 1 schematically shows a conventional Bluetooth system. The Bluetooth system includes a server 11 capable of wireless data transmission, and a terminal 13 for receiving the data from the server 11. The server 11 includes a converting portion (not shown) for converting transmitted data into data for wireless transmission, and a wireless transmitting portion (not shown) for transmitting the data converted by the converting portion.

An example of such a Bluetooth system is taken from a case of a wireless data transceiver system among computers and other office appliances. By using the computers and a printer embedded with Bluetooth chips for wireless data transmission and reception, a document edited on monitors of the computers can be printed out by the printer without wires connecting the computers and the printer. Another example is taken from a case where the Bluetooth system is used in record shops, exhibitions, or the like, to wirelessly provide music or information to shoppers or visitors. In the latter case, the music or information is stored in a database, so that users can receive their required music or information in the shop or the exhibition venue through the terminals 13 they are holding.

According to the conventional Bluetooth system, however, data is unilaterally transmitted from the server 11 to the terminal 13 of the user. Accordingly, the user sometimes cannot obtain his/her desired information appropriately. That is, if shoppers could selectively obtain their desired music, they could easily decide which record to buy. If visitors to the exhibition can selectively obtain their desired information at their desired time, they could understand exhibits more easily. According to the conventional Bluetooth system, however, since music or information is transmitted only according to a predetermined list and order, information cannot be transmitted to the users flexibly as the users wish. Accordingly, the users have to receive all the unnecessary information transmitted from the server 11 until they finally obtain their desired information.

SUMMARY OF THE INVENTION

The present invention has been made to overcome the problems of the related art, and accordingly, it is an object of the present invention to provide a control method for wireless data transmission and reception capable of maximizing convenience to users and providing promotional or educational benefits to information providers by enabling users to selectively obtain their desired information in public places such as record shops, stores, exhibitions, hospitals, or the like, and a system for accomplishing the control method.

Another object of the present invention is to provide a server and a terminal used by the control method for wireless data transmission and reception.

The first object is accomplished by a control method for controlling mutual wireless data transmission and reception between a terminal and a server that is embedded with a Bluetooth function according to the present invention, including the steps of preparing a database which stores the data to be transmitted from the server to the terminal, the data being classified into a plurality of items; transmitting an item selecting program to the terminal, the item selecting program through which a user selects at least one of the items that the user wishes to receive from the server; receiving from the terminal a user's input item that is selected by the user through the item selecting program executed by the terminal; and transmitting data corresponding to the user's input item to the terminal.

The above object is also accomplished by a control method for controlling data transmission and reception of a terminal that is embedded with a Bluetooth function for mutual wireless data transmission and reception with a server according to the present invention, including the steps of receiving an item selecting program from the server, the item selecting program providing an item selecting menu through which a user can select at least one item in a database, the database storing a plurality of classified items; displaying the item selecting menu by executing the item selecting program; transmitting to the server a data about a user's selection that is made through the item selecting program; receiving from the server data corresponding to the item selected by the user; and displaying the data to the user.

Before the step of transmitting the item selecting program, the server and the terminal are wirelessly connected for the mutual wireless data transmission and reception therebetween.

According to the present invention, by using the item selecting program, the user can select one or more items and accordingly receive his/her desired data corresponding to the selected item. Accordingly, user convenience, and promotional and educational benefits are increased.

Meanwhile, according to the present invention, a server and a terminal embedded with Bluetooth function are provided for performing the above control method.

BRIEF DESCRIPTION OF THE DRAWINGS

The above object and other features of the present invention will be clarified by the following description with attached drawings, in which.

DETAILED DESCRIPTION OF THE PREFERRED EMBODIMENT

This invention will be described in further detail by way of example with reference to the attached drawings.

Figure 1:
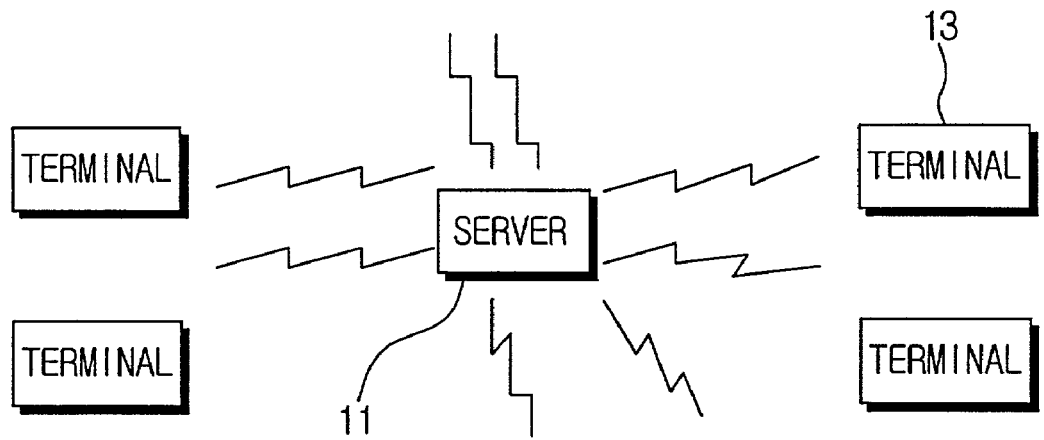
FIG. 1 is a schematic view showing a conventional wireless data transceiver system using the Bluetooth.
Figure 2:
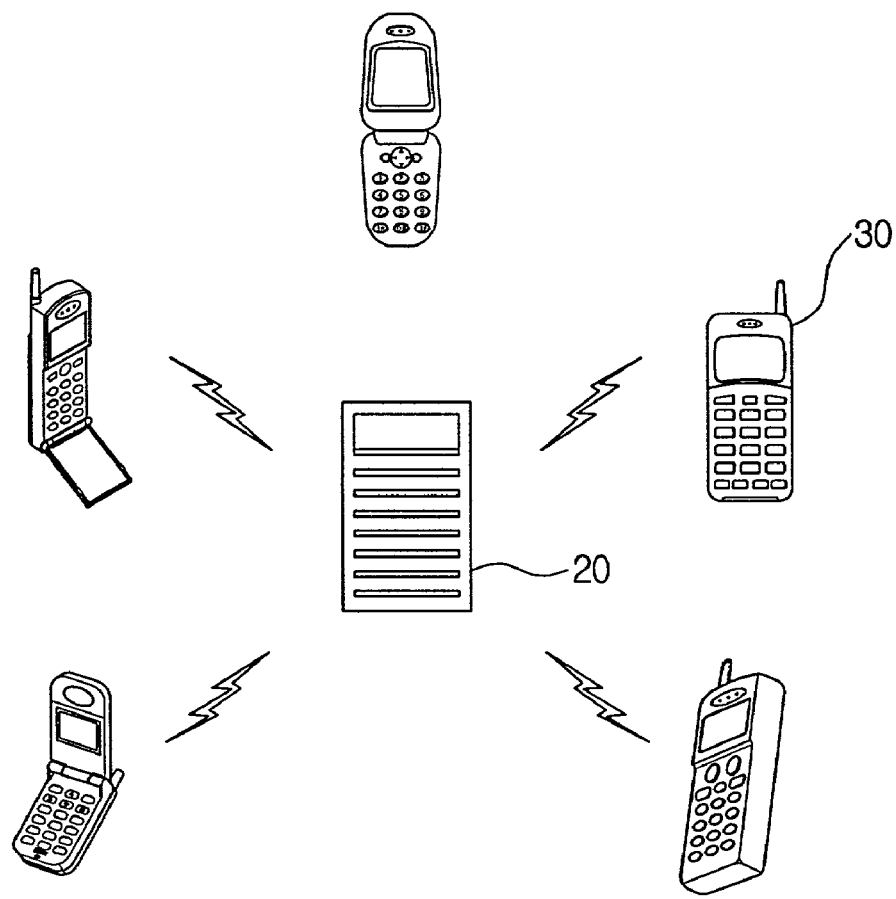
FIG. 2 is a schematic view showing a wireless data transceiver system according to the present invention.

FIG. 2 schematically shows the wireless data transceiver system according to the present invention. The wireless data transceiver system, so-called Bluetooth system includes a server 20 for wirelessly transmitting and receiving data, and a terminal 30 for receiving the data from the server 20. Although the embodiment of the present invention depicts mobile phones as the terminal 30, any general terminals embedded with the Bluetooth chips are also applicable. In this embodiment, for wireless data transmission and reception, the mobile phones are embedded with Bluetooth chips.

Figure 3:
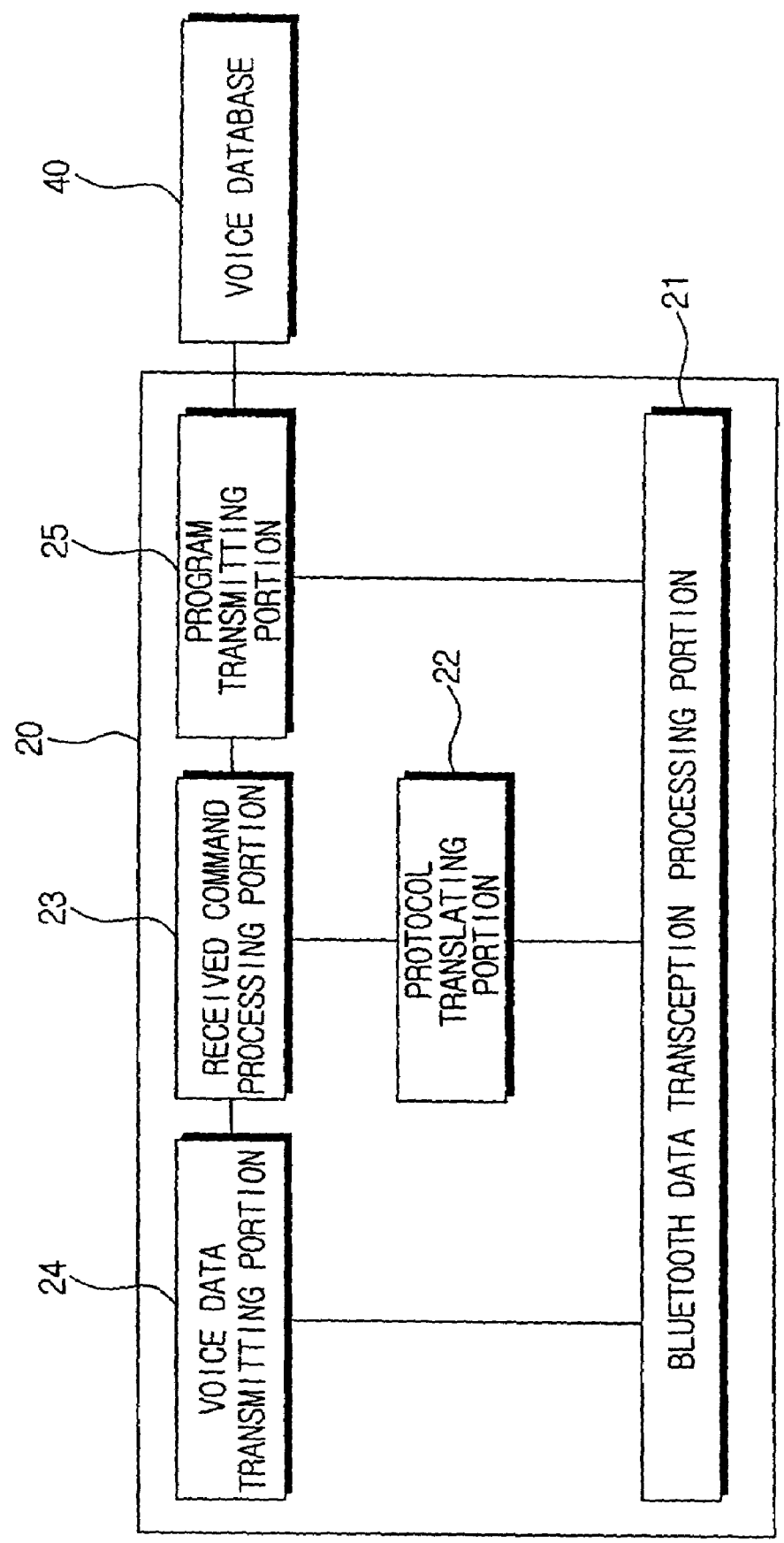
FIG. 3 is a block diagram showing the structure of the server of FIG. 2.

FIG. 3 is a block diagram showing the structure of the server 20 of FIG. 2. The server 20 includes a Bluetooth data transception processing portion 21 for enabling wireless data transmission and reception, a protocol translating portion 22 for translating the received wireless data, a received command processing portion 23 for processing commands translated by the protocol translating portion 22, and transmitting the coded data to the terminal 30, and a program transmitting portion 25 for transmitting to the terminal 30 of the user an item selecting program which provides items for selection by the user.

The server 20 is connected to a database 40. The database 40 stores data to be transmitted from the server 20 to the terminal 30. The data stored in the database 40 are classified into a plurality of items. The database 40 can be stored in a separate storing device (not shown) connected to the server 30, for providing information to the server 30. Alternatively, the database 40 can also be stored in a storing portion (not shown) of the server 20 such as a memory. The contents stored in the database 40 vary depending on the places the Bluetooth system is used. For example, the database 40 used for the record shop may store various music information, while the database 40 used for the exhibition may store information about the exhibits. For the public service building, the database 40 may store information about services of respective departments and procedures. The data can be stored in the form of text, or voice data. The data is also stored under respective items, such as music items, exhibits, or the like.

Figure 4:
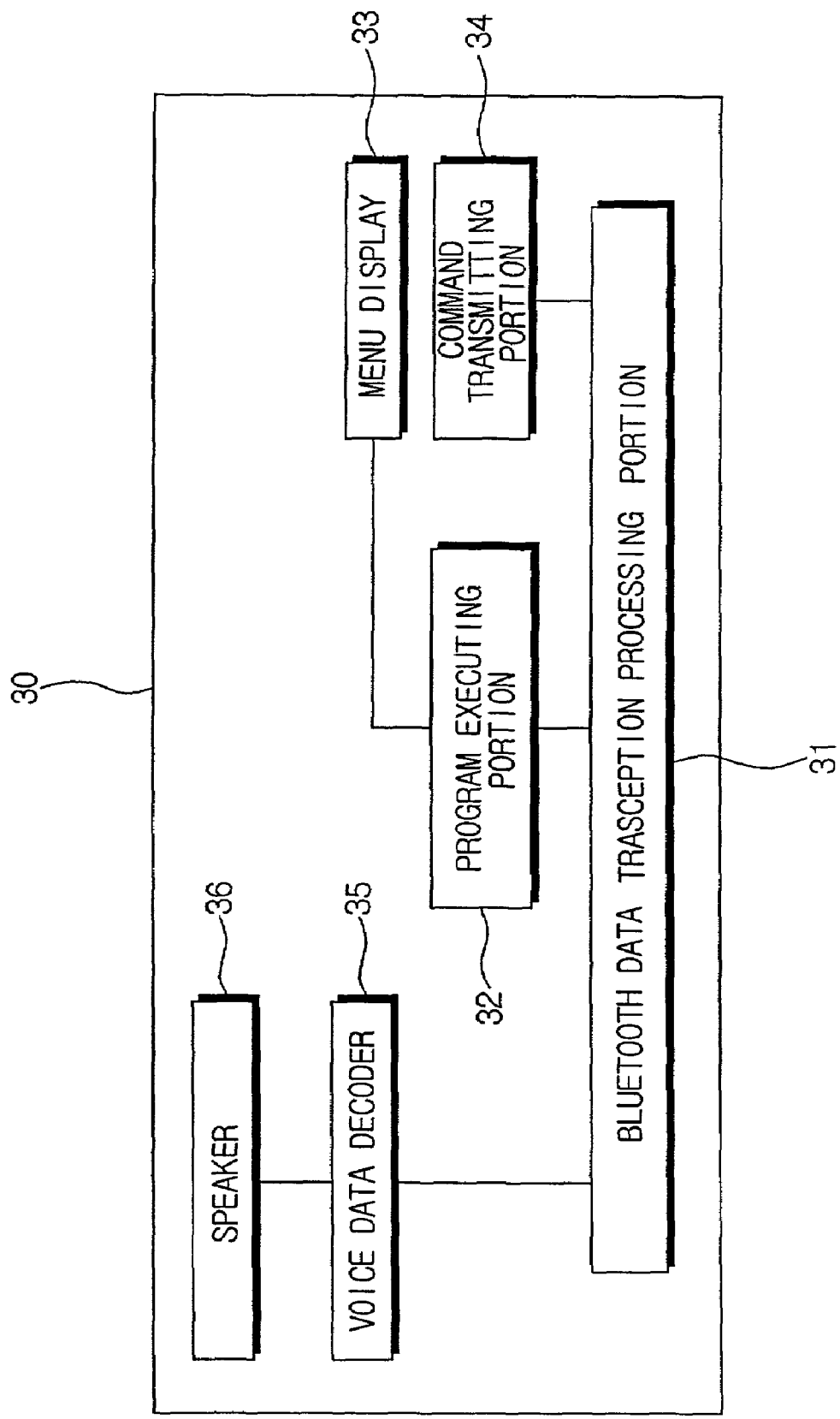
FIG. 4 is a block diagram showing the structure of the terminal of FIG. 2.

FIG. 4 is a block diagram showing the structure of the terminal 30 shown in FIG. 2. The terminal 30 includes a transception processing portion 31 for enabling a wireless data transmission and reception, a program executing portion 32 for executing the item selecting program received from the server 20, a menu display 33 for displaying to the user the item selecting program executed by the program executing portion 32, a command transmitting portion 34 for transmitting to the server 20 both the item selecting data which is input by the user through the item selecting menu provided by the item selecting program, and the command input by the user, a voice data decoder 35 for decoding the voice data received from the server 20, and a speaker 36 for outputting the voice data decoded by the voice data decoder 35 in the form of voice.

Figure 5:
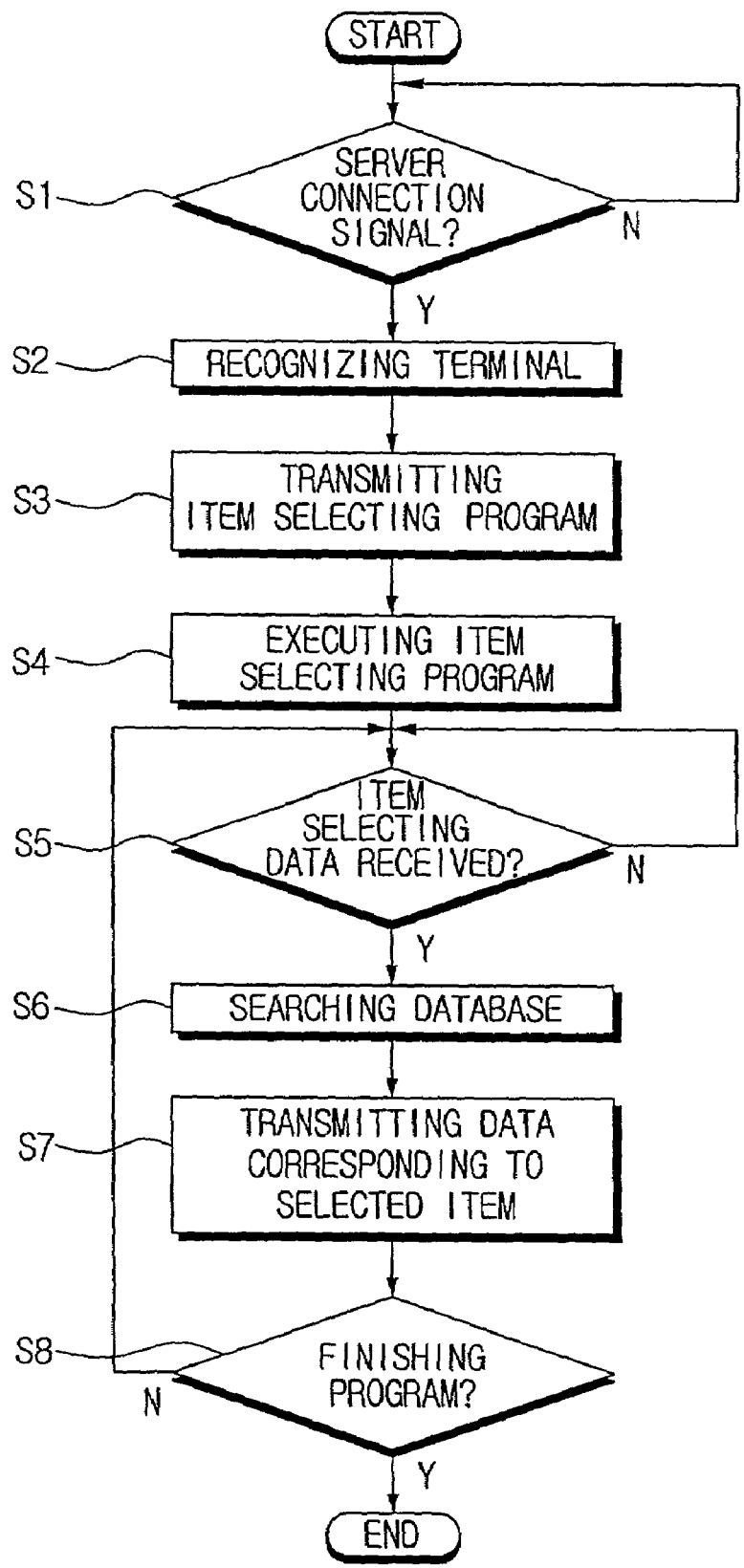
FIG. 5 is a flowchart for explaining a control method for a wireless data transmission and reception according to the present invention.

FIG. 5 is a flowchart for explaining a control method for a wireless data transmission and reception between the server 20 and the terminal 30. First, in order to control the wireless data transmission and reception according to the present invention, the terminal 30 should be connected to the server 20. The user manipulates keys of the keypad of the terminal 30, and accordingly, the command transmitting portion 34 transmits a signal to the server 20 for a connection to the server 20 (step S1). The Bluetooth data transception processing portion 21 of the server 20 receives the signal, and the received command processing portion 23 translates the signal and recognizes the existence of the terminal 30 (step S2). The processes (S1 and S2) are required for the mobile phone embedded with the Bluetooth chip used as the terminal 30 to notify the server 20 about its existence within the data transmittable distance. When using the terminal 30 made for the purpose of the wireless data transmission and reception with the server 20, the processes (S1 and S2) can be omitted.

When the terminal 30 is connected to the server 20, the server 20 wirelessly transmits the item selecting program to the terminal 30 through the program transmitting portion 25 (step S3). The item selecting program is received at the Bluetooth data transception processing portion 31 of the terminal 30, and executed by the program executing portion 32 (step S4). When the item selecting program is executed, the item selecting menu is displayed on the menu display 33, and the terminal user selects his/her desired item among the items stored in the database 40.

When the user selects his/her desired item through manipulation of the keys of the terminal 30, the data about the user's selection is transmitted to the server 20 by the command transmitting portion 34, and the Bluetooth data transception processing portion 21 of the server 20 receives the selection data (step S5). The received command processing portion 23 searches the database 40 according to the received selection data, and finds data corresponding to the selected item (step S6). The voice data transmitting portion 24 converts such found data into a voice signal, and transmits the voice signal to the terminal 30 (step S7). Accordingly, the voice signal corresponding to the user's selection is received at the user's terminal 30, and the user receives the data through the speaker 36 of the terminal 30.

After obtaining his/her desired data, the user may end the item selecting program (step S8), or select another item through the item selecting program (step S5). According to the user, data transmission may be completed, or another new data may be transmitted through the above processes (S6 and S7).

Although this embodiment depicts the case where the voice data is transmitted and received, image data or text data can also be transmitted and received. In the latter case, the text or image data is displayed on the menu display 33.

According to the present invention, the item selecting program is transmitted from the server 20 to the terminal 30 of the user, and the user can select his/her desired item through the item selecting program. Accordingly, the users can selectively obtain the data they desire to obtain in the places such as record shops, stores, exhibitions, hospitals, public service buildings, or the like, by using the Bluetooth terminals. As a result, conveniences to the users, and the promotional or educational benefits are increased.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A control method for controlling data transmission and reception of a terminal that is embedded with a Bluetooth function for mutual wireless data transmission and reception with a server, comprising the steps of:
   i) receiving an item selecting program from the server by Bluetooth embedded terminal, the item selecting program providing an item selecting menu through which a user can select at least one item in a database, the database storing data of a plurality of classified items;
   ii) displaying the item selecting menu by executing the item selecting program;
   iii) transmitting to the server data from the Bluetooth embedded terminal about a user's selection that is made through the item selecting program;
   iv) receiving from the server data corresponding to the item selected by the user; and
   v) displaying the data corresponding to the item selected by the user.

2. The control method of claim 1, further comprising, before the step i), a step of wirelessly connecting the server and the terminal for the mutual wireless data transmission and reception between the server and the terminal.

3. The control method of claim 1, wherein the data stored in the database is voice data.

4. A Bluetooth server, comprising:
   an embedded Bluetooth function, including a Bluetooth data transception processing portion for wirelessly transmitting data to a terminal and receiving data a terminal;
   a database for storing the data to be transmitted to the terminal, the data being classified into a plurality of items;
   a program transmitting portion for transmitting to the terminal through the Bluetooth data transception processing portion an item selecting program through which the user selects at least one item among the plurality of items; and
   a data transmitting portion for transmitting data of the database corresponding to the item selected by the user to the terminal through the Bluetooth data processing portion, when receiving from the terminal the item selected by the user through the item selecting program.

5. A Bluetooth terminal, comprising:

an embedded Bluetooth function, including a Bluetooth data transception processing portion for wirelessly transmitting a data to a server and receiving a data from the server;

a program executing portion for receiving an item selecting program from the server through the Bluetooth data transception processing portion and executing the item selecting program, through which the user selects an item among a plurality of items;

a command transmitting portion for transmitting to the server data corresponding to the item selected by the user through the item selecting program; and display means for displaying to the user the data received from the server, the data corresponding to the item selected by the user through the Bluetooth data transception processing portion.

* * * * *